United States Patent
Phillips et al.

(10) Patent No.: US 11,653,668 B2
(45) Date of Patent: May 23, 2023

(54) GUM BASES INCORPORATING POLYMERS DERIVED FROM RUSSIAN DANDELION

(71) Applicant: WM. WRIGLEY JR. COMPANY, Chicago, IL (US)

(72) Inventors: David R. Phillips, Downers Grove, IL (US); Xiaohu Xia, Deerfield, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 516 days.

(21) Appl. No.: 16/337,423

(22) PCT Filed: Sep. 29, 2017

(86) PCT No.: PCT/US2017/054314
§ 371 (c)(1),
(2) Date: Mar. 28, 2019

(87) PCT Pub. No.: WO2018/064484
PCT Pub. Date: Apr. 5, 2018

(65) Prior Publication Data
US 2020/0029587 A1 Jan. 30, 2020

Related U.S. Application Data

(60) Provisional application No. 62/402,450, filed on Sep. 30, 2016.

(51) Int. Cl.
*A23G 4/06* (2006.01)
*A23G 4/08* (2006.01)
*A23G 4/10* (2006.01)

(52) U.S. Cl.
CPC ............. *A23G 4/068* (2013.01); *A23G 4/064* (2013.01); *A23G 4/066* (2013.01); *A23G 4/08* (2013.01); *A23G 4/10* (2013.01); *A23G 2200/06* (2013.01); *A23G 2210/00* (2013.01)

(58) Field of Classification Search
CPC . A23G 4/066; A23G 4/08; A23G 4/10; A23G 2200/06; A23G 4/068; A23G 4/064; A23G 2200/00; A23G 4/062; A23G 2210/00; A23G 4/06; A23G 3/00; A23G 4/00
USPC .......................................................... 426/3
See application file for complete search history.

(56) References Cited

U.S. PATENT DOCUMENTS

| 2,344,916 A * | 3/1944 | Hartwig .................... A23G 4/06 524/575.5 |
| 2,393,035 A * | 1/1946 | Edwards ................. B29B 15/02 528/499 |
| 2003/0124220 A1 | 7/2003 | Hill et al. |
| 2004/0142066 A1* | 7/2004 | Andersen .................. A23G 4/06 426/3 |
| 2005/0170041 A1 | 8/2005 | Abraham et al. |
| 2007/0276112 A1* | 11/2007 | Buranov ................... C08C 3/00 528/1 |
| 2009/0017159 A1* | 1/2009 | Porsgaard .............. A23G 4/068 426/5 |
| 2011/0275142 A1 | 11/2011 | Wade et al. |

FOREIGN PATENT DOCUMENTS

| CN | 1071811 A | 5/1993 |
| CN | 103435720 B | 12/2015 |
| JP | 2016088939 A | 5/2016 |
| WO | 9616986 A1 | 5/1996 |
| WO | 0406686 A1 | 1/2004 |
| WO | 1297253 A1 | 7/2012 |
| WO | 2017040294 A1 | 3/2017 |

OTHER PUBLICATIONS

NPL Xu et al. (CN 1456144) [English Translation], (Year: 2003).*
Google Scholar Search result retrieved on Aug. 12, 2022 (Year: 2022).*
Buranov et al., "Extraction and Characterization of Latex and Natural Rubber from Rubber-Bearing Plants," J. Agric. Food Chem., 2010, (58)734-743 American Chemical Society.
Van Beilen et al., "Guayule and Russian Dandelion as Alternative Sources of Natural Rubber," Critical Review in Biotechnology, 2007, 27:217-231, Informa Healthcare.
Deng Haiyan, Dandelion Rubber Technology Development Heats Up, Jul. 31, 2012, 1, China Petroleum and Chemical Industry, with Machine Translation; 3 pages.

* cited by examiner

*Primary Examiner* — Erik Kashnikow
*Assistant Examiner* — Bhaskar Mukhopadhyay

(57) ABSTRACT

A chewing gum base comprises rubber derived from Russian Dandelion (TKS). Methods of extracting and purifying the rubber are provided. Gum base compositions and methods of compensating for variable ratios of elastomer:resin in the rubber are disclosed.

17 Claims, No Drawings

GUM BASES INCORPORATING POLYMERS DERIVED FROM RUSSIAN DANDELION

FIELD OF THE INVENTION

The presently disclosed subject matter relates to chewing gum base polymers derived from natural sources. More specifically, the present invention relates to gum bases which incorporate polymers derived from Russian Dandelion.

BACKGROUND OF THE INVENTION

Chewing gums comprise a water soluble phase and a water insoluble phase. The water soluble phase typically contains sweeteners, flavors, bulking agents and water soluble softeners. The water soluble components are quickly extracted during chewing, leaving a cud composed primarily of the insoluble phase which is the gum base. Chewing gum bases are complex multi-component mixtures which include, but are not limited to, synthetic resins, natural resins, synthetic rubbers, natural rubbers, fats, emulsifiers and fillers. Currently there is interest in delivering green or bio-based chewing gum products. These products can contain ingredients sourced from natural or renewable resources. Traditionally, gum bases incorporated chicle, a white, gummy latex obtained from the Sapodilla Tree (*Manilkara zapota*). This tree and related species are native to the jungles of Mexico, Central America and the Caribbean but have also been cultivated in Asia and the Philippines. The latex is obtained by tapping the trees and collecting the sap which is then boiled to remove excess water and transported to processing plants for further refinement. The process is labor and energy intensive and requires long distance shipping from the remote growing regions to the industrial processing locations. Due to shrinking supplies from tropical forests, increasing demand for chewing gum products and the high cost and variable quality of the natural product, chicle has largely been replaced by synthetic elastomers and elastomer solvents (also called elastomer plasticizers) such as butyl rubber, polyisobutylene, styrene-butadiene rubber, terpene resins and estergums in modern chewing gum manufacturing.

The fundamental components of a chewing gum typically are a water-insoluble gum base portion and a water-soluble bulking agent portion. The primary component of the gum base is an elastomeric polymer which provides the characteristic chewy texture of the product. The gum base will typically include other ingredients which modify the chewing properties or aid in processing the product. These include plasticizers, softeners, fillers, emulsifiers, plastic resins, as well as colorants and antioxidants. The water soluble portion of the chewing gum typically includes a bulking agent together with minor amounts of secondary components such as flavors, high-intensity sweeteners, colorants, water-soluble softeners, gum emulsifiers, acidulants and sensates. Typically, the water-soluble portion, sensates, and flavors dissipate during chewing and the gum base is retained in the mouth throughout the chew.

There is currently interest among both consumers and manufacturers to reduce reliance on non-renewable source for materials. There is additional interest in more natural sources of food materials. By "natural" it is generally meant that the sources are derived from plants or other biological sources with minimal processing.

*Taraxacum kok-saghyz*, often abbreviated as TKS and commonly referred to as the Kazakh dandelion, rubber root, or Russian dandelion, is a species of dandelion native to Kazakhstan that is notable for its production of high quality rubber.

SUMMARY OF THE INVENTION

The present invention comprises chewing gum base compositions containing high purity rubber obtained from the latex of the Russian Dandelion (*Taraxacum kok-saghyz*) commonly referred to as TKS. The invention further comprises methods of preparing a chewing gum base elastomer from the latex.

DESCRIPTION OF THE INVENTION

The present invention provides formulations and processes for preparing chewing gum bases from TKS rubber as well as methods of extracting TKS latex from the root of Russian Dandelion (*Taraxacum kok-saghyz*) and purifying the TKS Rubber from TKS latex.

TKS is the preferred species due to its high concentration of high quality rubber. However, other species of dandelion such as *Scorzonera tau-saghyz* (STS), and *Scorzonera Uzbekistanica* (SU) can also be used. For purposes of this invention, the term 'TKS' will refer to all species of dandelion.

By TKS Rubber it is meant the mixture of poly-isoprene elastomer and resin which is extracted from the TKS Latex present in the roots of the TKS Dandelion. TKS latex refers to the viscous emulsion of the TKS rubber naturally present in the plant roots.

Because latex extraction from TKS roots via tapping is not practical due to the small size of the roots and the viscous nature of latex, it is necessary to process the entire root and then extract and isolate the TKS rubber from the water and fibrous plant parts. Several basic methods may be employed.

The "Blender method" is a quick and popular extraction method, where TKS roots are ground with a food blender. It takes only 30 seconds to rupture the roots into fibrils. However, filtration could not retain all of the fibrils and therefore the latex is contaminated with small particles of root tissues Another extraction method, the "Flow Method" is a multi-step buffer extraction, creaming, and suction-drawing process which produces a high purity rubber latex (99%). Both methods are disclosed in greater detail in [J. Agric. Food Chem., Vol. 58, No. 2, 2010] which is hereby incorporated by reference.

To practice the "blender method", TKS roots are stored in a cold condition (below 10° C.) before processing. Within 3 days of harvest, 20 grams of chilled TKS roots are cut into small (less than 1 mm) pieces. Within 3 minutes of the first cut, the pieces are placed in a Waring blender (model 33BL79) containing 90 ml of ice-cold, aqueous extraction buffer (0.2% NaHCO3) and ground for 30 seconds. The slurry is transferred onto a 1 mm mesh porcelain Buchner funnel without filter paper and the homogenate is filtered through by slow vacuum suction with a water aspirator. The surface of the slurry is made level and pressed slightly with table spoon for efficient filtration. The remaining ground roots are returned to the Waring blender and reground for 30 seconds in another 90 ml of fresh extraction buffer. The slurry is again transferred onto the Buchner funnel and the homogenate filtered. The homogenates from both filtrations are pooled and stored in closed vessel at 4° C. until centrifugation. The homogenate (~180 ml) is centrifuged using 30 ml centrifuge tubes for 15 mins at 18500 g. The creamy latex layers on the surface of centrifuge tubes are collected by suction-drawing with a 10 ml pipet. The tubes are then re-centrifuged three more times using the same conditions, and latex layers are collected again as above. The latex is then dried in a vacuum oven at 40° C. for 2 days for characterization and gum base formulation.

To practice the "Flow Method", TKS roots are stored in a cold condition (below 10° C.) before processing. Within 3 days of harvest, the chilled TKS roots (250 g) are cut into 0.5 cm circular pieces with a knife. Within 3 minutes of cut, the pieces are placed into a 1 L glass flask containing 500 ml ice cold extraction buffer (0.3% NaHCO3 and 0.1% carboxymethyl cellulose) and shaken for 30 minutes at room temperature. The homogenate is decanted into an empty 2 L glass flask and another 500 ml of fresh extraction buffer is poured into the 1 L flask containing the root pieces. The mixture is shaken for another 30 minutes and decanted into a 2 L flask containing the previous homogenate. The process is repeated three more times. The homogenate is centrifuged in 30 ml centrifuge tubes for 5 minutes at the rate of 18500 g. The white creamy layer of latex is collected by suction-drawing using a pipette. The remaining solution is centrifuged again twice and the creamy layer of latex is collected again. Then the remaining solution is centrifuged for the fourth and fifth times and again the creamy layer of latex is collected. The latex is then dried in a vacuum oven at 40° C. for 2 days for characterization and gum base formulation.

Yet another method is "Water Milling". Still another method is "Green Dry Milling." These two processes were developed by Kok Technologies Inc.

It is important that the TKS Rubber of the present invention be food grade. While requirements for being food grade vary from country to country, food grade polymers intended for use as masticatory substances (i.e. gum base) will typically have to meet one or more of the following criteria. They may have to be approved by local food regulatory agencies for this purpose. They may have to be manufactured under "Good Manufacturing Practices" (GMPs) which may be defined by local regulatory agencies, such practices ensuring adequate levels of cleanliness and safety for the manufacturing of food materials. Materials (including reagents, catalysts, solvents and antioxidants) used in the manufacture will desirably be food grade (where possible) or at least meet strict standards for quality and purity. The finished product may have to meet minimum standards for quality and the level and nature of any impurities present, including residual monomer content. The manufacturing history of the material may be required to be adequately documented to ensure compliance with the appropriate standards. The manufacturing facility itself may be subject to inspection by governmental regulatory agencies. Again, not all of these standards may apply in all jurisdictions. As used herein, the term "food grade" will mean that the TKS rubber meets all applicable food standards in the locality where the product is manufactured and/or sold. Specifically, this can be achieved by using food ingredients to prepare the extraction buffers (e.g. baking soda or sodium hydroxide) and creaming agents (e.g. pectin, carboxyl methyl cellulose or polyethylene glycol (PEG)). The rubber latex should be rinsed repeatedly to remove allergic proteins and impurities before drying by boiling or vacuum.

Because TKS rubber is a natural product, the exact composition will vary due to weather, soil, agricultural location, and variations in plant genetics, among other factors. TKS rubber (exclusive of any impurities) will typically contain from 70 to 95% by weight of poly-isoprene elastomer with the balance being resin. Because the elastomer:resin ratio is important for the proper texture of the final product, it may be necessary to adjust the overall base formula by adding additional resin or elastomer based on the ratio in the specific batch of TKS rubber used. Typically it will be necessary to add additional resin (also called elastomer solvent or elastomer plasticizer). The preferred resins are terpene resins such as polymers of alpha-pinene, beta-pinene and d-limonene. Generally, it is desirable to have the overall elastomer:resin ratio in the range of 1:1 to 1:5, or between 1:1 to 1:4 or about 1:2. The exact ratio will depend on the desired textural properties of the chewing gum and gum base and on the remaining composition of the chewing gum and gum base.

Because TKS rubber elastomer has a much higher molecular weight (about 1.8 million) than typical gum base elastomers (less than half a million) it may be necessary to use higher resin levels than would be typical of conventional gum base elastomers. Alternatively, it may be desirable to subject the rubber to an intensive grinding process, for example by using a Banbury mixer.

The present invention includes a method for producing gum base batches having consistent texture by:
a. creating a master formula for a gum base having a desired texture and containing at least TKS rubber and a terpene resin using a first TKS rubber batch having a known ratio of elastomer:resin;
b. analyzing a second batch of TKS Rubber to determine its elastomer:resin ratio;
c. adjusting the levels of TKS rubber and terpene resin in the formula to compensate for the difference in elastomer:resin ratios of the second batch of TKS rubber compared to the first batch of TKS rubber such that the final elastomer level and resin level in the gum base match those of the master formula; and
d. preparing at least one batch of gum base using the adjusted formula.

An alternative method of compensating for variations in the ratio of elastomer to resin in the TKS rubber is to standardize batches to a pre-determined ratio which is selected to be roughly in the middle of the natural range by:
a. selecting a standardized ratio of elastomer:resin falling within the natural range of TKS rubber batches;
b. blending two or more batches of TKS rubber having known ratios of elastomer:resin to create a first standardized batch of TKS rubber having the selected ratio of elastomer:resin;
c. formulating at least one gum base using the first standardized batch of TKS rubber;
d. preparing at least a second standardized batch of TKS rubber having the same elastomer:resin ratio as the first standardized batch of TKS rubber; and
e. preparing at least one batch of the at least one formulated gum base using the at least second standardized batch of TKS rubber.

Alternatively, this method can also be accomplished by:
a. selecting a first batch of TKS rubber having a known ratio of elastomer:resin;
b. formulating at least one gum base using the first batch of TKS rubber;
c. blending two or more batches of TKS rubber having known ratios of elastomer:resin to create a standardized batch of TKS rubber having the same elastomer:resin ratio as the first batch of TKS rubber; and
d. preparing at least one batch of the at least one formulated gum base using the standardized batch of TKS rubber.

Fats, waxes and acetylated monoglycerides can enhance the effect of the suitable plasticizers when incorporated into the gum bases of the present invention. However, fats and waxes may not be suitable for use as the sole plasticizers in these compositions.

The water-insoluble gum base of the present invention may optionally contain conventional petroleum-based elastomers such as styrene-butadiene rubber, butyl rubber and polyisobutylene. These conventional elastomers may be combined in any compatible ratio with the TKS rubber. In a preferred embodiment, significant amounts (more than 1 wt. %) of these conventional elastomers are not incorporated into a gum base of the present invention. In other preferred embodiments, less than 15 wt. % and preferably less than 10 wt. % and more preferably less than 5 wt. % of petroleum-based elastomers are contained in the gum base of the present invention. In some embodiments these elastomers may be derived from renewable resources.

The water-insoluble gum base of the present invention may optionally contain other natural elastomers such as chicle and related natural rubbers. These may comprise 0 to 5% by weight of the gum base.

Other ingredients which may optionally be employed include inorganic fillers such as calcium carbonate and talc, emulsifiers such as lecithin and mono- and di-glycerides, plastic resins such as polyvinyl acetate, polyvinyl laurate, and vinylacetate/vinyl laurate copolymers, colors and antioxidants. In some embodiments these elastomers may be derived from renewable resources.

The water-insoluble gum base of the present invention may constitute from about 5 to about 95% by weight of the chewing gum. More typically it may constitute from about 10 to about 50% by weight of the chewing gum and, in various preferred embodiments, may constitute from about 20 to about 35% by weight of the chewing gum.

A typical gum base useful in this invention includes about 1 to 30 wt. % TKS rubber, 0 to 20 wt. % synthetic elastomer, 0 to 20 wt. % natural elastomer other than TKS rubber, about 0 to about 40% by weight resin (in addition to that present in the TKS rubber), about 0 to about 35 wt. % filler, about 0 to about 35 wt. % softener, 0 to 5 wt. % emulsifier, and 0 to 40 wt. % hydrophilic modifier.

In some embodiments, gum bases of the present invention will include at least 5 wt. %, or at least 10 wt. %, or at least 15 wt. %, or at least 20 wt. % of one or more softeners. In some embodiments the gum base will contain less than 40 wt. %, or less than 35 wt. % softener. Softeners that typically are used include tallow, hydrogenated tallow, hydrogenated and partially hydrogenated vegetable oils, cocoa butter paraffin wax, microcrystalline wax, natural waxes and combinations thereof. Lecithin, acetylated and unacetylated mono- and di-glycerides also function as softeners, although their primary purpose is to act as emulsifiers to improve compatibility of the various gum base components.

Still further, a typical gum base includes 5 to 40 wt. % and more typically 15 to 30 wt. % hydrophilic modifier such as polyvinyl acetate having a GPC weight average molecular weight of about 2,000 to about 90,000, polyethylene, vinyl acetate-vinyl laurate copolymer having vinyl laurate content of about 5 to about 50 percent by weight of the copolymer, and combinations thereof. In some embodiments of the present invention, the hydrophilic modifier will be present at a level of at least 5 wt. %, or at least 10 wt. %, or at least 15 wt. %, or at least 20 wt. % of the gum base. In some embodiments the gum base will contain less than 40 wt. %, or less than 35 wt. % of the hydrophilic modifier. The preferred hydrophilic modifier is polyvinyl acetate. The molecular weight of the polyvinyl acetate used in the present invention will vary depending on the properties desired. In some cases it will be desirable to include polyvinyl acetate polymers of varying molecular weights. Particularly preferred are polyvinyl acetates having GPC average molecular weight of 50,000 to 80,000 and 10,000 to 65,000, although higher weight may be desirable in bubblegum bases.

Fillers typically are inorganic, water-insoluble powders such as magnesium and calcium carbonate, ground limestone, silicate types such as magnesium and aluminum silicate, clay, alumina, talc, titanium oxide, mono-, di- and tri-calcium phosphate and calcium sulfate. Insoluble organic fillers including cellulose polymers such as wood as well as combinations of any of these also may be used. Gum bases of the present invention will typically contain about 5 to about 50 wt. % filler. In some embodiments, the gum base will contain at least 5 wt. %, or at least 10 wt. %, or at least 15 wt. %, or at least 20 wt. % or at least 25 wt. % filler. In some embodiments the gum base will contain less than 50 wt. %, or less than 40 wt. % filler.

Additional elastomers may include, but are not limited to, polyisobutylene having a viscosity average molecular weight of about 100,000 to about 800,000, isobutylene-isoprene copolymer (butyl elastomer), polyolefin thermoplastic elastomers such as ethylene-propylene copolymer and ethylene-octene copolymer, styrene-butadiene copolymers having styrene-butadiene ratios of about 1:3 to about 3:1 and/or polyisoprene, and combinations thereof. Natural elastomers which may be similarly incorporated into the gum bases of the present inventions include jelutong, lechi caspi, perillo, sorva, massaranduba balata, massaranduba chocolate, nispero, rosindinha, chicle, gutta hang kang, and combinations thereof. Such elastomers may constitute form 0 to 20 wt. % of the gum base.

Resins (sometimes called elastomer solvents or elastomer plasticizers or tackifiers) commonly used for petroleum-based elastomers may be optionally used in this invention including, but not limited to, natural rosin esters, often called estergums, such as glycerol esters of partially hydrogenated rosin, glycerol esters of polymerized rosin, glycerol esters of partially or fully dimerized rosin, glycerol esters of rosin, pentaerythritol esters of partially hydrogenated rosin, methyl and partially hydrogenated methyl esters of rosin, pentaerythritol esters of rosin, glycerol esters of wood rosin, glycerol esters of gum rosin; synthetics such as terpene resins derived from alpha-pinene, beta-pinene, and/or d-limonene; and any suitable combinations of the foregoing. The preferred resins for TKS rubber are terpene resins, although other resins may be used, especially if other elastomers are present.

Emulsifiers (which may also act as softeners) include mono- and di-glycerides, acetylated mono- and di-glycerides, lecithin and other food acceptable emulsifiers may be used to improve compatibility of the base components and reduce separation of base components after mixing. Such emulsifiers are typically used at the minimum effective level such as less than 1 wt. % or about 1 wt. %, or about 2 wt. %, or up to about 5 wt. %.

Additionally, optional minor amounts (e.g., about 1 wt. % or less) of miscellaneous ingredients such as colorants, antioxidants, and the like may be added to the gum base of the present invention.

Selection of various components in chewing gum bases or chewing gum formulations of this invention typically are dictated by factors, including for example the desired properties (e.g., physical (mouthfeel), taste, odor, and the like) and/or applicable regulatory requirements (e.g., in order to have a food grade product, food grade components, such as food grade approved oils like vegetable oil, must be used.)

Colorants and whiteners may include FD&C-type dyes and lakes, fruit and vegetable extracts, titanium dioxide, and combinations thereof.

Antioxidants such as BHA, BHT, tocopherols, propyl gallate and other food acceptable antioxidants may be employed to prevent oxidation of fats, oils and elastomers in the gum base.

The base may include wax or be wax-free. An example of a wax-free gum base is disclosed in U.S. Pat. No. 5,286,500, the disclosure of which is incorporated herein by reference.

A water-insoluble gum base typically constitutes approximately 5 to about 95 percent, by weight, of a chewing gum of this invention; more commonly, the gum base comprises 10 to about 50 percent of a chewing gum of this invention; and in some preferred embodiments, 20 to about 35 percent, by weight, of such a chewing gum.

In addition to a water-insoluble gum base portion, a typical chewing gum composition includes a water-soluble bulk portion (or bulking agent) and one or more flavoring agents. The water-soluble portion can include high intensity sweeteners, binders, flavoring agents (which may be water insoluble), water-soluble softeners, gum emulsifiers, colorants, acidulants, fillers, antioxidants, and other components that provide desired attributes.

Water-soluble softeners, which are also known as water-soluble plasticizers and plasticizing agents, generally constitute between approximately 0.5 to about 15% by weight of the chewing gum. Preferably glycerin is used as a water soluble softener. Aqueous sweetener solutions such as those containing sorbitol, hydrogenated starch hydrolysates (HSH), corn syrup and combinations thereof, may also be used as softeners and binding agents (binders) in chewing gum.

Preferably, a bulking agent or bulk sweetener will be useful in chewing gums of this invention to provide sweetness, bulk and texture to the product. Typical bulking agents include sugars, sugar alcohols, and combinations thereof. Bulking agents typically constitute from about 5 to about 95% by weight of the chewing gum, more typically from about 20 to about 80% by weight and, still more typically, from about 30 to about 70% by weight of the gum. Sugar bulking agents generally include saccharide containing components commonly known in the chewing gum art, including, but not limited to, sucrose, dextrose, maltose, dextrin, dried invert sugar, fructose, levulose, galactose, corn syrup solids, and the like, alone or in combination. In sugarless gums, sugar alcohols such as sorbitol, maltitol, erythritol, isomalt, mannitol, xylitol and combinations thereof are substituted for sugar bulking agents. Combinations of sugar and sugarless bulking agents may also be used.

In addition to the above bulk sweeteners, chewing gums typically comprise a binder/softener in the form of a syrup or high-solids solution of sugars and/or sugar alcohols. In the case of sugar gums, corn syrups and other dextrose syrups (which contain dextrose and significant amounts higher saccharides) are most commonly employed. These include syrups of various DE levels including high-maltose syrups and high fructose syrups. In the case of sugarless products, solutions of sugar alcohols including sorbitol solutions and hydrogenated starch hydrolysate syrups are commonly used. Also useful are syrups such as those disclosed in U.S. Pat. No. 5,651,936 and US 2004-0234648 which are incorporated herein by reference. Such syrups serve to soften the initial chew of the product, reduce crumbliness and brittleness and increase flexibility in stick and tab products. They may also control moisture gain or loss and provide a degree of sweetness depending on the particular syrup employed. In the case of syrups and other aqueous solutions, it is generally desirable to use the minimum practical level of water in the solution to the minimum necessary to keep the solution free-flowing at acceptable handling temperatures. The usage level of such syrups and solutions should be adjusted to limit total moisture in the gum to less than 3 wt. %, preferably less than 2 wt. % and most preferably less than 1 wt. %.

High intensity artificial sweeteners can also be used in combination with the above-described sweeteners. Preferred sweeteners include, but are not limited to sucralose, aspartame, salts of acesulfame, alitame, neotame, saccharin and its salts, cyclamic acid and its salts, glycyrrhizin, stevia and stevia compounds such as rebaudioside A, dihydrochalcones, thaumatin, monellin, lo han guo and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8% by weight. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; fructooligosaccharides (NutraFlora); Palatinose oligosaccharide; Guar Gum Hydrolysate (Sun Fiber); or indigestible dextrin (Fibersol). However, other low calorie bulking agents can be used. In addition, the caloric content of a chewing gum can be reduced by increasing the relative level of gum base while reducing the level of caloric sweeteners in the product. This can be done with or without an accompanying decrease in piece weight.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion. Sensate components which impart a perceived tingling or thermal response while chewing, such as a cooling or heating effect, also may be included. Such components include cyclic and acyclic carboxamides, menthol derivatives, and capsaicin among others. Acidulants may be included to impart tartness.

In addition to typical chewing gum components, chewing gums of the present invention may include active agents such as dental health actives such as minerals, nutritional supplements such as vitamins, health promoting actives such as antioxidants for example resveratrol, stimulants such as caffeine, medicinal compounds and other such additives. These active agents may be added neat to the gum mass or encapsulated using known means to prolong release and/or prevent degradation. The actives may be added to coatings, rolling compounds and liquid or powder fillings where such are present.

The present invention may be used with a variety of processes for manufacturing chewing gum including batch mixing, continuous mixing and tableted gum processes.

Exemplary methods of extrusion, which may optionally be used in conjunction with the present invention, include the following, the entire contents of each being incorporated herein by reference: (i) U.S. Pat. No. 6,238,710, claims a method for continuous chewing gum base manufacturing, which entails compounding all ingredients in a single extruder; (ii) U.S. Pat. No. 6,086,925 discloses the manufacture of chewing gum base by adding a hard elastomer, a filler and a lubricating agent to a continuous mixer; (iii) U.S. Pat. No. 5,419,919 discloses continuous gum base manufacture using a paddle mixer by selectively feeding different ingredients at different locations on the mixer; and, (iv) yet another U.S. Pat. No. 5,397,580 discloses continuous gum base manufacture wherein two continuous mixers are arranged in series and the blend from the first continuous mixer is continuously added to the second extruder.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, tabs or pellets or by extruding and cutting into chunks.

Generally, the ingredients are mixed by first softening or melting the gum base and adding it to the running mixer. The gum base may alternatively be softened or melted in the mixer. Color and emulsifiers may be added at this time.

A chewing gum softener such as glycerin can be added next along with part of the bulk portion. Further parts of the bulk portion may then be added to the mixer. Flavoring agents are typically added with the final part of the bulk portion. The entire mixing process typically takes from about five to about fifteen minutes, although longer mixing times are sometimes required.

In yet another alternative, it may be possible to prepare the gum base and chewing gum in a single high-efficiency extruder as disclosed in U.S. Pat. No. 5,543,160. Chewing gums of the present invention may be prepared by a continuous process comprising the steps of: a) adding gum base ingredients into a high efficiency continuous mixer; b) mixing the ingredients to produce a homogeneous gum base, c) adding at least one sweetener and at least one flavor into the continuous mixer, and mixing the sweetener and flavor with the remaining ingredients to form a chewing gum product; and d) discharging the mixed chewing gum mass from the single high efficiency continuous mixer. Of course, many variations on the basic gum base and chewing gum mixing processes are possible.

After mixing, the chewing gum mass may be formed, for example by rolling or extruding into and desired shape such as sticks, tabs, chunks or pellets. The product may also be filled (for example with a liquid syrup or a powder) and/or coated for example with a hard sugar or polyol coating using known methods.

After forming, and optionally filling and/or coating, the product will typically be packaged in appropriate packaging materials. The purpose of the packaging is to keep the product clean, protect it from environmental elements such as oxygen, moisture and light and to facilitate branding and retail marketing of the product.

EXAMPLES

The following examples of the invention and comparative formulations are provided to illustrate, but not to limit, the invention which is defined by the attached claims. Amounts listed are in weight percent.

Three batches of TKS rubber prepared by any of above described extraction and purification methods are given as Examples 1-3 in Table 1.

TABLE 1

|  | Ex. 1 | Ex. 2 | Ex. 3 |
|---|---|---|---|
| Poly isoprene | 95 | 80 | 70 |
| resin | 5 | 20 | 30 |

Gum base formulas can be prepared according to Examples 4-57 in Tables 2-10.

TABLE 2

|  | Ex. 4 | Ex. 5 | Ex. 6 | Ex. 7 | Ex. 8 | Ex. 9 |
|---|---|---|---|---|---|---|
| TKS Rubber of Ex. 1 | 10 | 15 | 5 | 10 | 15 | 5 |
| Talc | 20 | 20 | 20 |  |  |  |
| Calcium Carbonate |  |  |  | 20 | 20 | 20 |
| Terpene resin | 20 | 30 | 10 | 20 | 30 | 10 |
| Polyvinyl Acetate | 25 | 10 | 40 | 25 | 10 | 40 |
| Vegetable fats | 15 | 15 | 15 | 15 | 15 | 15 |
| Emulsifier | 4.95 | 4.95 | 4.95 | 4.95 | 4.95 | 4.95 |
| Wax | 5 | 5 | 5 | 5 | 5 | 5 |
| Anti-oxidant | 0.05 | 0.05 | 0.05 | 0.05 | 0.05 | 0.05 |
| Total | 100 | 100 | 100 | 100 | 100 | 100 |

TABLE 3

|  | Ex. 10 | Ex. 11 | Ex. 12 | Ex. 13 | Ex. 14 | Ex. 15 |
|---|---|---|---|---|---|---|
| TKS Rubber of Ex. 2 | 10 | 15 | 5 | 10 | 15 | 5 |
| Talc | 20 | 20 | 20 |  |  |  |
| Calcium Carbonate |  |  |  | 20 | 20 | 20 |
| Terpene resin | 20 | 30 | 10 | 20 | 30 | 10 |
| Polyvinyl Acetate | 25 | 10 | 40 | 25 | 10 | 40 |
| Vegetable fats | 15 | 15 | 15 | 15 | 15 | 15 |
| Emulsifier | 4.95 | 4.95 | 4.95 | 4.95 | 4.95 | 4.95 |
| Wax | 5 | 5 | 5 | 5 | 5 | 5 |
| Anti-oxidant | 0.05 | 0.05 | 0.05 | 0.05 | 0.05 | 0.05 |
| Total | 100 | 100 | 100 | 100 | 100 | 100 |

TABLE 4

|  | Ex. 16 | Ex. 17 | Ex. 18 | Ex. 19 | Ex. 20 | Ex. 21 |
|---|---|---|---|---|---|---|
| TKS Rubber of Ex. 3 | 10 | 15 | 5 | 10 | 15 | 5 |
| Talc | 20 | 20 | 20 |  |  |  |
| Calcium Carbonate |  |  |  | 20 | 20 | 20 |
| Terpene resin | 20 | 30 | 10 | 20 | 30 | 10 |

TABLE 4-continued

|  | Ex. 16 | Ex. 17 | Ex. 18 | Ex. 19 | Ex. 20 | Ex. 21 |
|---|---|---|---|---|---|---|
| Polyvinyl Acetate | 25 | 10 | 40 | 25 | 10 | 40 |
| Vegetable fats | 15 | 15 | 15 | 15 | 15 | 15 |
| Emulsifier | 4.95 | 4.95 | 4.95 | 4.95 | 4.95 | 4.95 |
| Wax | 5 | 5 | 5 | 5 | 5 | 5 |
| Anti-oxidant | 0.05 | 0.05 | 0.05 | 0.05 | 0.05 | 0.05 |
| Total | 100 | 100 | 100 | 100 | 100 | 100 |

TABLE 5

|  | Ex. 22 | Ex. 23 | Ex. 24 | Ex. 25 | Ex. 26 | Ex. 27 |
|---|---|---|---|---|---|---|
| TKS Rubber of Ex. 1 | 20 | 20 | 20 | 20 | 20 | 20 |
| Talc | 20 | 20 | 20 |  |  |  |
| Calcium Carbonate |  |  |  | 20 | 20 | 20 |
| Terpene resin | 35 | 35 | 35 | 35 | 35 | 35 |
| Polyvinyl Acetate | 0 | 0 | 0 | 0 | 0 | 0 |
| Vegetable fats | 15 | 19 | 15 | 15 | 19 | 15 |
| Emulsifier | 4.95 | 0.95 | 0.95 | 4.95 | 0.95 | 0.95 |
| Wax | 5 | 5 | 9 | 5 | 5 | 9 |
| Anti-oxidant | 0.05 | 0.05 | 0.05 | 0.05 | 0.05 | 0.05 |
| Total | 100 | 100 | 100 | 100 | 100 | 100 |

TABLE 6

|  | Ex. 28 | Ex. 29 | Ex. 30 | Ex. 31 | Ex. 32 | Ex. 33 |
|---|---|---|---|---|---|---|
| TKS Rubber of Ex. 2 | 20 | 20 | 20 | 20 | 20 | 20 |
| Talc | 20 | 20 | 20 |  |  |  |
| Calcium Carbonate |  |  |  | 20 | 20 | 20 |
| Terpene resin | 35 | 35 | 35 | 35 | 35 | 35 |
| Polyvinyl Acetate | 0 | 0 | 0 | 0 | 0 | 0 |
| Vegetable fats | 15 | 19 | 15 | 15 | 19 | 15 |
| Emulsifier | 4.95 | 0.95 | 0.95 | 4.95 | 0.95 | 0.95 |
| Wax | 5 | 5 | 9 | 5 | 5 | 9 |
| Anti-oxidant | 0.05 | 0.05 | 0.05 | 0.05 | 0.05 | 0.05 |
| Total | 100 | 100 | 100 | 100 | 100 | 100 |

TABLE 7

|  | Ex. 34 | Ex. 35 | Ex. 36 | Ex. 37 | Ex. 38 | Ex. 39 |
|---|---|---|---|---|---|---|
| TKS Rubber of Ex. 3 | 20 | 20 | 20 | 20 | 20 | 20 |
| Talc | 20 | 20 | 20 |  |  |  |
| Calcium Carbonate |  |  |  | 20 | 20 | 20 |
| Terpene resin | 35 | 35 | 35 | 35 | 35 | 35 |
| Polyvinyl Acetate | 0 | 0 | 0 | 0 | 0 | 0 |
| Vegetable fats | 15 | 19 | 15 | 15 | 19 | 15 |
| Emulsifier | 4.95 | 0.95 | 0.95 | 4.95 | 0.95 | 0.95 |
| Wax | 5 | 5 | 9 | 5 | 5 | 9 |
| Anti-oxidant | 0.05 | 0.05 | 0.05 | 0.05 | 0.05 | 0.05 |
| Total | 100 | 100 | 100 | 100 | 100 | 100 |

TABLE 8

|  | Ex. 40 | Ex. 41 | Ex. 42 | Ex. 43 | Ex. 44 | Ex. 45 |
|---|---|---|---|---|---|---|
| TKS Rubber of Ex. 1 | 10 | 15 | 10 | 15 | 10 | 15 |
| Terpene resin | 20 | 30 | 20 | 30 | 25 | 35 |
| Polyvinyl Acetate | 45 | 30 | 45 | 30 | 45 | 30 |
| Vegetable fats | 15 | 15 | 20 | 20 | 20 | 20 |
| Emulsifier | 4.95 | 4.95 | 4.95 | 4.95 | 4.95 | 4.95 |
| Wax | 5 | 5 |  |  |  |  |
| Anti-oxidant | 0.05 | 0.05 | 0.05 | 0.05 | 0.05 | 0.05 |
| Total | 100 | 100 | 100 | 100 | 100 | 100 |

TABLE 9

|  | Ex. 46 | Ex. 47 | Ex. 48 | Ex. 49 | Ex. 50 | Ex. 51 |
|---|---|---|---|---|---|---|
| TKS Rubber of Ex. 2 | 10 | 15 | 10 | 15 | 10 | 15 |
| Terpene resin | 20 | 30 | 20 | 30 | 25 | 35 |
| Polyvinyl Acetate | 45 | 30 | 45 | 30 | 45 | 30 |
| Vegetable fats | 15 | 15 | 20 | 20 | 20 | 20 |
| Emulsifier | 4.95 | 4.95 | 4.95 | 4.95 | 4.95 | 4.95 |
| Wax | 5 | 5 |  |  |  |  |
| Anti-oxidant | 0.05 | 0.05 | 0.05 | 0.05 | 0.05 | 0.05 |
| Total | 100 | 100 | 100 | 100 | 100 | 100 |

TABLE 10

|  | Ex. 52 | Ex. 53 | Ex. 54 | Ex. 55 | Ex. 56 | Ex. 57 |
|---|---|---|---|---|---|---|
| TKS Rubber of Ex. 3 | 10 | 15 | 10 | 15 | 10 | 15 |
| Terpene resin | 20 | 30 | 20 | 30 | 25 | 35 |
| Polyvinyl Acetate | 45 | 30 | 45 | 30 | 45 | 30 |
| Vegetable fats | 15 | 15 | 20 | 20 | 20 | 20 |
| Emulsifier | 4.95 | 4.95 | 4.95 | 4.95 | 4.95 | 4.95 |
| Wax | 5 | 5 |  |  |  |  |
| Anti-oxidant | 0.05 | 0.05 | 0.05 | 0.05 | 0.05 | 0.05 |
| Total | 100 | 100 | 100 | 100 | 100 | 100 |

To illustrate the method of creating a Master Formula and adjusting the formula to compensate for natural variability in TKS Rubber Batches, The formulas in Table 11 can be created. Note that the Gum Base of Example 11 (from Table 3) contains a total of 12% elastomer and 33% resin due to the composition of TKS rubber Example 2 being 80% elastomer and 20% resin by weight. Examples 58 and 59 use TKS rubber batches (from Table 1) that have different ratios of elastomer and resin. Therefore the levels of TKS rubber and Terpene resin are adjusted to produce gum bases having essentially identical overall compositions. Since the TKS resin may differ from the separately added terpene resin, slight adjustments in the level of terpene resin may be required. With experience, these could be incorporated into standard formulas which incorporate TKS rubbers of naturally varying composition.

TABLE 11

|  | Ex. 11 | Ex. 58 | Ex. 59 |
|---|---|---|---|
| TKS Rubber of Ex. 2 | 15 |  |  |
| TKS Rubber of |  | 12.63 |  |

TABLE 11-continued

|  | Ex. 11 | Ex. 58 | Ex. 59 |
|---|---|---|---|
| Ex. 1 |  |  |  |
| TKS Rubber of |  |  | 17.14 |
| Ex. 3 |  |  |  |
| Terpene resin | 30 | 32.37 | 27.86 |
| Talc | 20 | 20 | 20 |
| Calcium |  |  |  |
| Carbonate |  |  |  |
| Polyvinyl Acetate | 10 | 10 | 10 |
| Vegetable fats | 15 | 15 | 15 |
| Emulsifier | 4.95 | 4.95 | 4.95 |
| Wax | 5 | 5 | 5 |
| Anti-oxidant | 0.05 | 0.05 | 0.05 |
| Total | 100 | 100 | 100 |

To illustrate the method of preparing standardized batches of TKS rubber to compensate for natural variations in the composition of TKS rubber, a first standardized batch of TKS rubber is prepared according to Example 60 in Table 12. That standardized TKS rubber can be used to formulate gum bases such as Examples 64-66 in Table 13. Any of the three standardized TKS rubbers (Ex. 60-62) may be used in the chewing gum bases of Examples 64-66 in Table 13 with no effect on the overall composition.

To illustrate the alternative method of preparing standardized batches of TKS rubber to compensate for natural variations in the composition of TKS rubber, TKS Rubber of Example 2 was used as the target to prepare a standardized TKS rubber batch (Example 63 in Table 12. The standardized TKS rubber of Example 63 may be used in any Gum Base Example incorporating the TKS rubber of Example 2 (for example, those listed in Table 9) with no effect on the overall composition.

TABLE 12

|  | Ex. 60 | Ex. 61 | Ex. 62 | Ex. 2 | Ex. 63 |
|---|---|---|---|---|---|
| TKS Rubber of Ex. 1 | 59.80 | 33.33 | 40.00 |  | 40.00 |
| TKS Rubber of Ex. 2 |  | 66.67 | 50.00 | 100.00 |  |
| TKS Rubber of Ex. 3 | 40.20 |  | 10.00 |  | 60.00 |
| Total: Composition | 100.00 | 100.00 | 100.00 | 100.00 | 100.00 |
| Poly isoprene | 85 | 85 | 85 | 80 | 80 |
| resin | 15 | 15 | 15 | 20 | 20 |

TABLE 13

|  | Ex. 64 | Ex. 65 | Ex. 66 |
|---|---|---|---|
| TKS Rubber of any of Ex. 60-Ex. 62 | 15.00 | 20.00 | 22.00 |
| Terpene resin | 30.00 | 32.00 | 29.00 |
| Calcium Carbonate | 20.00 | 13.00 | 15.00 |
| Polyvinyl Acetate | 10.00 | 15.00 | 10.00 |
| Vegetable fats | 15.00 | 17.95 | 15.00 |
| Emulsifier | 4.95 | 2.00 | 3.95 |
| Wax | 5.00 |  | 5.00 |
| Anti-oxidant | 0.05 | 0.05 | 0.05 |
| Total | 100.00 | 100.00 | 100.00 |

To illustrate the use of the inventive TKS rubber gum bases in a chewing composition, any of the above gum base Examples may be used in the chewing gum compositions of Example 67 in Table 14.

TABLE 14

|  | Ex. 67 | Ex. 68 | Ex. 69 |
|---|---|---|---|
| Gum Base of any of Ex. 4-59 or Ex. 64-66 | 25.00 | 30.00 | 33.00 |
| Sorbitol | 51.80 | 46.45 | 43.10 |
| Hydrogenated Starch Hydrolysate syrup | 15.00 | 15.00 | 15.00 |
| Mannitol | 5.00 | 5.00 | 5.00 |
| Peppermint Flavor | 1.10 | 1.20 | 1.30 |
| Lecithin | 0.80 | 0.90 | 1.00 |
| High Intensity Sweetener | 0.20 | 0.25 | 0.30 |
| Encapsulated High Intensity Sweetener | 1.10 | 1.20 | 1.30 |
| Total | 100.00 | 100.00 | 100.00 |

Although the presently disclosed subject matter and its advantages have been described in detail, it should be understood that various changes, substitutions and alterations can be made herein without departing from the spirit and scope of the disclosed subject matter as defined by the appended claims. Moreover, the scope of the present disclosure is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods, or steps.

Patents, patent applications, publications, product descriptions, and protocols are cited throughout this application the disclosures of which are incorporated herein by reference in their entireties for all purposes.

What is claimed is:

1. A chewing gum base comprising
   1 to 30 wt. % TKS rubber,
   an additional a resin that is present in an amount of up to about 40% by weight, the resin comprising terpene resin;
   0 to 20 wt. % synthetic elastomer,
   0 to 20 wt. % natural elastomer other than TKS rubber,
   about 0 to about 35 wt. % filler,
   about 0 to about 35 wt. % softener,
   0 to 5 wt. % emulsifier, and
   0 to 40 wt. % hydrophilic modifier;
   wherein the TKS rubber comprises 70-95% polyisoprene elastomer and a balance of resin, and
   wherein the ratio of the polyisoprene elastomer to total resin in the composition gum base is from 1:1 to 1:5.

2. The gum base of claim 1 wherein the TKS rubber is extracted by a blender method using only food acceptable solvents and reagents.

3. The gum base of claim 1 wherein the TKS rubber is extracted by a flow method using only food acceptable solvents and reagents.

4. The gum base of claim 1 wherein the TKS rubber is extracted by a water milling method using only food acceptable solvents and reagents.

5. The gum base of claim 1 wherein the TKS rubber is extracted by a green dry-milling method using only food acceptable solvents and reagents.

6. The gum base of claim 1 wherein the TKS rubber is ground to reduce its molecular weight prior to incorporation into the gum base.

7. A method of producing compositionally consistent chewing gum bases comprising the steps of
    a. creating a master formula for a gum base having a desired texture and containing at least TKS rubber and a terpene resin using a first TKS rubber batch having a known ratio of polyisoprene elastomer:resin;
    b. analyzing a second batch of TKS Rubber to determine its polyisoprene elastomer:resin ratio;
    c. adjusting the levels of TKS rubber and terpene resin in the master formula to compensate for the difference in polyisoprene elastomer:resin ratios of the second batch of TKS rubber compared to the first batch of TKS rubber such that the final polyisoprene elastomer level and resin level in the gum base match those of the master formula; and
    d. preparing at least one batch of gum base using the adjusted formula.

8. A method of producing compositionally consistent chewing gum bases comprising the steps of
    a. selecting a standardized ratio of polyisoprene elastomer:resin falling within the natural range of about 70 to 95% polyisoprene elastomer and a balance of resin;
    b. blending two or more batches of TKS rubber having known ratios of polyisoprene elastomer:resin to create a first standardized batch of TKS rubber having the selected standardized ratio of polyisoprene elastomer:resin;
    c. formulating at least one gum base using the first standardized batch of TKS rubber;
    d. preparing at least a second standardized batch of TKS rubber having the same polyisoprene elastomer:resin ratio as the first standardized batch of TKS rubber; and
    e. preparing at least one batch of the at least one formulated gum base using the at least second standardized batch of TKS rubber.

9. A method of producing compositionally consistent chewing gum bases comprising the steps of,
    a. selecting a first batch of TKS rubber having a known ratio of polyisoprene elastomer:resin;
    b. formulating at least one gum base using the first batch of TKS rubber;
    c. blending two or more batches of TKS rubber having the known ratios of poly isoprene elastomer:resin to create a standardized batch of TKS rubber having the same polyisoprene elastomer:resin ratio as the first batch of TKS rubber; and
    d. preparing at least one batch of the at least one formulated gum base using the standardized batch of TKS rubber.

10. The method of claim 7 wherein the TKS rubber is ground to reduce its molecular weight prior to incorporation into the gum base.

11. The method of claim 8 wherein the TKS rubber is ground to reduce its molecular weight prior to incorporation into the gum base.

12. The method of claim 9 wherein the TKS rubber is ground to reduce its molecular weight prior to incorporation into the gum base.

13. The gum base of claim 1, wherein the ratio of the polyisoprene elastomer to total resin in the composition is from 1:1 to 1:4.

14. The gum base of claim 13, wherein the ratio of the polyisoprene elastomer to total resin in the composition is from 1:1 to 1:2.

15. The chewing gum base of claim 1, wherein the chewing gum base is produced by a method comprising the steps of:
    a. creating a master formula for a gum base having a desired texture and containing at least TKS rubber and a terpene resin using a first TKS rubber batch having a known ratio of polyisoprene elastomer:resin;
    b. analyzing a second batch of TKS Rubber to determine its polyisoprene elastomer:resin ratio;
    c. adjusting the levels of TKS rubber and terpene resin in the master formula to compensate for the difference in polyisoprene elastomer:resin ratios of the second batch of TKS rubber compared to the first batch of TKS rubber such that the final polyisoprene elastomer level and resin level in the gum base match those of the master formula; and
    d. preparing at least one batch of gum base using the adjusted formula.

16. The chewing gum base of claim 1, wherein the chewing gum base is produced by a method comprising:
    a. selecting a standardized ratio of polyisoprene elastomer:resin falling within the natural range of about 70 to 95% polyisoprene elastomer and a balance of resin;
    b. blending two or more batches of TKS rubber having known ratios of polyisoprene elastomer:resin to create a first standardized batch of TKS rubber having the selected standardized ratio of polyisoprene elastomer:resin;
    c. formulating at least one gum base using the first standardized batch of TKS rubber;
    d. preparing at least a second standardized batch of TKS rubber having the same polyisoprene elastomer:resin ratio as the first standardized batch of TKS rubber; and
    e. preparing at least one batch of the at least one formulated gum base using the at least second standardized batch of TKS rubber.

17. The chewing gum base of claim 1, wherein the chewing gum base is produced by a method comprising:
    a. selecting a first batch of TKS rubber having a known ratio of polyisoprene elastomer:resin;
    b. formulating at least one gum base using the first batch of TKS rubber;
    c. blending two or more batches of TKS rubber having the known ratios of polyisoprene elastomer:resin to create a standardized batch of TKS rubber having the same polyisoprene elastomer:resin ratio as the first batch of TKS rubber; and
    d. preparing at least one batch of the at least one formulated gum base using the standardized batch of TKS rubber.

* * * * *